(12) United States Patent
Darak et al.

(10) Patent No.: US 11,405,981 B1
(45) Date of Patent: Aug. 2, 2022

(54) ROUTING SERVER COMMUNICATIONS THROUGH A NEARBY MOBILE DEVICE

(71) Applicant: NortonLifeLock Inc., Tempe, AZ (US)

(72) Inventors: Anand Darak, Rahuri (IN); Sharad Subhash Mhaske, Ahmednagar (IN)

(73) Assignee: NORTONLIFELOCK INC., Tempe, AZ (US)

( * ) Notice: Subject to any disclaimer, the term of this patent is extended or adjusted under 35 U.S.C. 154(b) by 72 days.

(21) Appl. No.: 16/877,177

(22) Filed: May 18, 2020

(51) Int. Cl.
*H04W 88/06* (2009.01)
*H04W 52/02* (2009.01)
*H04W 84/12* (2009.01)
*H04W 4/80* (2018.01)

(52) U.S. Cl.
CPC ............. *H04W 88/06* (2013.01); *H04W 4/80* (2018.02); *H04W 52/0261* (2013.01); *H04W 84/12* (2013.01)

(58) Field of Classification Search
CPC ..... H04W 40/22; H04W 52/46; H04W 88/04; H04W 88/06; H04W 4/80; H04W 84/12; H04W 52/0261
See application file for complete search history.

(56) References Cited

U.S. PATENT DOCUMENTS

| | | | | |
|---|---|---|---|---|
| 6,654,610 B1* | 11/2003 | Chen | ....................... | H04L 69/24 370/347 |
| 10,677,866 B1* | 6/2020 | Rinott | ................ | G01R 33/4804 |
| 2001/0026543 A1* | 10/2001 | Hwang | ............. | H04W 72/0406 370/335 |
| 2002/0141359 A1* | 10/2002 | Jei | ..................... | H04W 72/1289 370/347 |
| 2003/0125051 A1* | 7/2003 | Leppisaari | ............ | H04L 1/1692 455/515 |

(Continued)

FOREIGN PATENT DOCUMENTS

KR 20180107997 A * 10/2018 ........ H04W 28/0236
WO WO-2005025147 A1 * 3/2005 ............. H04L 45/44

OTHER PUBLICATIONS

Google Developers; Nearby—"A platform for discovering and communicating with nearby devices."; Webpage located at: https://developers.google.com/nearby/; accessed on May 18, 2020; 1 page.

*Primary Examiner* — Charles T Shedrick
(74) *Attorney, Agent, or Firm* — Maschoff Brennan (57) ABSTRACT

Routing server communications through a nearby mobile device. In some embodiments, the method may include establishing a direct communication channel between the first mobile device and the second mobile device, determining which of the first mobile device and the second mobile device is currently a more efficient mobile device that is able to communicate with a server device more efficiently, sending a first server query from the less efficient mobile device to the more efficient mobile device over the direct communication channel, forwarding the first server query from the more efficient mobile device to the server device over the Internet, receiving a first server response at the more efficient mobile device from the server device over the Internet, and forwarding the first server response from the more efficient mobile device to the less efficient mobile device over the direct communication channel.

20 Claims, 4 Drawing Sheets

(56) References Cited

U.S. PATENT DOCUMENTS

| | | | |
|---|---|---|---|
| 2015/0163840 A1* | 6/2015 | Ji | H04W 76/38 455/552.1 |
| 2016/0014668 A1* | 1/2016 | Chou | H04W 76/14 455/7 |
| 2018/0225653 A1* | 8/2018 | Vokes | G06Q 20/3226 |
| 2019/0021004 A1* | 1/2019 | Shanmugavadivel | H04W 12/08 |
| 2021/0280004 A1* | 9/2021 | Burman | G07F 17/32 |

* cited by examiner

ROUTING SERVER COMMUNICATIONS THROUGH A NEARBY MOBILE DEVICE

BACKGROUND

Computer software applications configured to run on mobile devices (e.g., smartphones, tablets, etc.), also known as mobile applications or mobile apps, are increasingly popular in everyday life. Common mobile applications include email applications, calendar applications, contact applications, game applications, GPS applications, and shopping applications. While some mobile applications function properly when only run periodically, other mobile applications are configured to run constantly in order to function properly.

One mobile application that is configured to run constantly in order to function properly is a security application. A security application running on a mobile device may be configured to monitor and/or secure the mobile device. For example, a security application may be employed on a mobile device to monitor and protect against security events (e.g., malware infections, malware attacks, etc.) on the mobile device.

One problem with a mobile application that is configured to run constantly is that the mobile application may tend to consume relatively high amounts of resources, such as battery, memory, processor, and bandwidth resources. One exacerbation of this consumption of relatively high amounts of resources is caused by the mobile applications additionally communicating with a server over the Internet. Continuing with the security application example, the security application may periodically communicate over the Internet with a corresponding security application running on a server device. These communications may be related to security events on the mobile device (e.g., malware infections, malware attacks, etc.). Therefore, this periodic communication with a server over the Internet may cause a mobile application to further consume additional resources, which may exacerbate the relatively high amount of resources already consumed due to the mobile application running constantly.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for routing server communications through a nearby mobile device may be performed, at least in part, by a first mobile device including one or more processors and by a second mobile device including one or more processors. The method may include establishing a direct communication channel between the first mobile device and the second mobile device while within a range of the direct communication channel. The method may also include sharing, between the first mobile device and the second mobile device, first device state data of the first mobile device and second device state data of the second mobile device. The method may further include determining, by the first mobile device and/or by the second mobile device, which of the first mobile device and the second mobile device is currently a more efficient mobile device that is able to communicate with a server device more efficiently, and which is a less efficient mobile device, based on the first device state data and the second device state data. The method may also include sending, from the less efficient mobile device to the more efficient mobile device over the direct communication channel, a first server query. The method may further include forwarding, from the more efficient mobile device to the server device over the Internet, the first server query. The method may also include receiving, at the more efficient mobile device from the server device over the Internet, a first server response. The method may further include forwarding, from the more efficient mobile device to the less efficient mobile device over the direct communication channel, the first server response.

In some embodiments, the method may further include, in response to the first server response, performing a remedial action at the less efficient mobile device to protect the less efficient mobile device from a first security event. In these embodiments, the performing of the remedial action at the less efficient mobile device may include one or more of blocking the less efficient mobile device from accessing the Internet, rolling back one or more changes at the less efficient mobile device that were made as a result of the first security event, and disabling the less efficient mobile device, powering off the less efficient mobile device.

In some embodiments, the direct communication channel may include a Bluetooth channel. In these embodiments, the Bluetooth channel may include a Bluetooth Low Energy (BLE) channel.

In some embodiments, the direct communication channel may include a Wi-Fi channel.

In some embodiments, the first device state data may include a first battery level state of the first mobile device, and the second device state data may include a second battery level state of the second mobile device.

In some embodiments, the first device state data may include a first user interaction state of the first mobile device, and the second device state data may include a second user interaction state of the second mobile device.

In some embodiments, the first device state data may include a first metered Internet connection state or a first nonmetered Internet connection state of the first mobile device, and the second device state data comprises a second metered Internet connection state or a second nonmetered Internet connection state of the second mobile device.

In some embodiments, the first device state data may include a first processor usage state of the first mobile device, and the second device state data may include a second processor usage state of the second mobile device.

In some embodiments, the first device state data may include a first memory usage state of the first mobile device, and the second device state data may include a second memory usage state of the second mobile device.

In some embodiments, the first device state data may include a first running apps category state of the first mobile device, and the second device state data may include a second running apps category state of the second mobile device.

In some embodiments, the first device state data of the first mobile device and second device state data of the second mobile device may be shared between a first security application of the first mobile device and a second security application of the second mobile device. In these embodiments, the determining of which of the first mobile device and the second mobile device is currently a more efficient mobile device that is able to communicate with a server device more efficiently, and which is a less efficient mobile device, may be determined by the first security application and/or by the second security application. In these embodiments, the first server query may be related to a first security event of the less efficient mobile device. In these embodiments, the performing of a first remedial action may be performed by the first security application or by the second security application. Also, in these embodiments, the first security event of the less efficient mobile device may match a second security event of the more efficient mobile device, and the method may further include, in response to the first server response, performing, by the first security application or by the second security application, a second remedial action at the more efficient mobile device to protect the more efficient mobile device from the second security event.

Further, in some embodiments, one or more non-transitory computer-readable media may include one or more computer-readable instructions that, when executed by one or more processors, cause the one or more processors to perform a method for routing server communications through a nearby mobile device.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

While some mobile applications function properly when only run periodically, other mobile applications, such as security applications, are configured to run constantly in order to function properly. Security applications may be configured to monitor and/or secure a mobile device. Unfortunately, however, a security application may tend to consume relatively high amounts of resources, such as battery, memory, processor, and bandwidth resources. One exacerbation of this consumption of relatively high amounts of resources may be caused by the security applications additionally communicating with a server device over the Internet. For example, a security application on a mobile device may periodically communicate with a corresponding security application running on a server device. This communication may be related to a security event on the mobile device (e.g., a malware infection, a malware attack, etc.). Therefore, this periodic communication with a server device over the Internet may cause a security application to further consume additional resources, which may exacerbate the relatively high amount of resources already consumed due to the security application running constantly.

Some embodiments disclosed herein may route server communications through a nearby mobile device in order to decrease the amount of resources consumed by mobile applications by avoiding direct communication with a server device over the Internet. For example, a first mobile application (e.g., a first security application) on a first mobile device and a second mobile application (e.g., a second security application) on a second mobile device may establish a direct communication channel (e.g., a Bluetooth channel) between the first mobile device and the second mobile device while within a range of the direct communication channel (e.g., within a range of Bluetooth communications). The first and second mobile applications may then share first device state data of the first mobile device and second device state data of the second mobile device (e.g., state data such as battery level, processor usage, memory usage, user interaction state, metered Internet connection state, and a running apps category state). The first and second mobile applications may then determine which of the first mobile device and the second mobile device is currently a more efficient mobile device that is able to communicate with a server device more efficiently based on the first device state data and the second device state data (e.g., based on which mobile device has a higher current battery charged percentage, less current user interaction, a nonmetered Wi-Fi connection, a lower current processor usage percentage, a lower current memory usage percentage, or lower priority or less resource intensive apps currently running). Then, once the more efficient mobile device is identified (e.g., the mobile device that is able to more efficiently send query communication to a server over the Internet without the least degradation to the performance of the mobile device), the less efficient mobile device may send a first server query to the more efficient mobile device over a less resource-intensive direct communication channel (instead of sending the first server query directly to the server device over the Internet), the more efficient mobile device may forward the first server query to the server device over the Internet, the more efficient mobile device may receive a first server response from the server device over the Internet, and the more efficient mobile device may forward the first server response to the less efficient mobile device over the less resource-intensive direct communication channel.

In this manner, the mobile application (e.g., a security application) of the less efficient mobile device may avoid exacerbating the relatively high amount of resources already consumed (due to the mobile application running constantly) by avoiding direct communication (e.g., related to security events such as malware infections, malware attacks, etc.) with a server device over the Internet.

This automatic routing of server communications through a nearby mobile device may further improve situations where multiple devices (e.g., of a single user or of multiple users) may benefit from server communications being shared locally among the devices, rather than all of the devices directly communicating individually with the server device. For example, security applications, such as malware scanning applications, may be intended to run on modern mobile devices (e.g., smart phones and smart tablets) with relatively large memory heaps (i.e. >32 MB). Further, Android background execution restrictions may require memory and process intensive mechanisms such as "Accessibility Services" to allow security applications to provide ongoing protection. Thus, endpoint security applications, such as Norton™ Mobile Security (NMS) applications, may be top battery and network bandwidth consumers on mobile devices. Thus, some users may complain that their mobile devices appear to be slowing down due to resources consumed by security applications that are constantly running to protect their mobile devices. Further, in some embodiments, it may be possible to predict possible future events on multiple mobile devices, such as app updates or alerts, system updates or alerts, and app content receipt such as social or messaging app notifications. Further, historical events may be repeated in spite of showing proactive security mitigation based on similar overlapped events on other mobile devices. Often, these example types of events may overlap between multiple mobile devices being used by single user, or multiple mobile devices that are often found nearby one another, such and multiple mobile devices used by family members of a single household. For these types of redundant events, each security application on each mobile device may end up sending similar server queries to a backend server device, which may result in redundant receipt of similar server responses. Therefore, some embodiments of the invention may automatically route a single server query, and then share the corresponding server response, with multiple nearly mobile devices. This may allow multiple nearby mobile devices to benefit from a single server query and response being shared locally among the devices (e.g., over a relatively less resource-intensive direct communication channel), rather than all of the devices needing to send similar or identical individual server queries and receiving similar or identical server responses over the Internet (e.g., a relatively more resource-intensive indirect communication channel).

Figure 1:
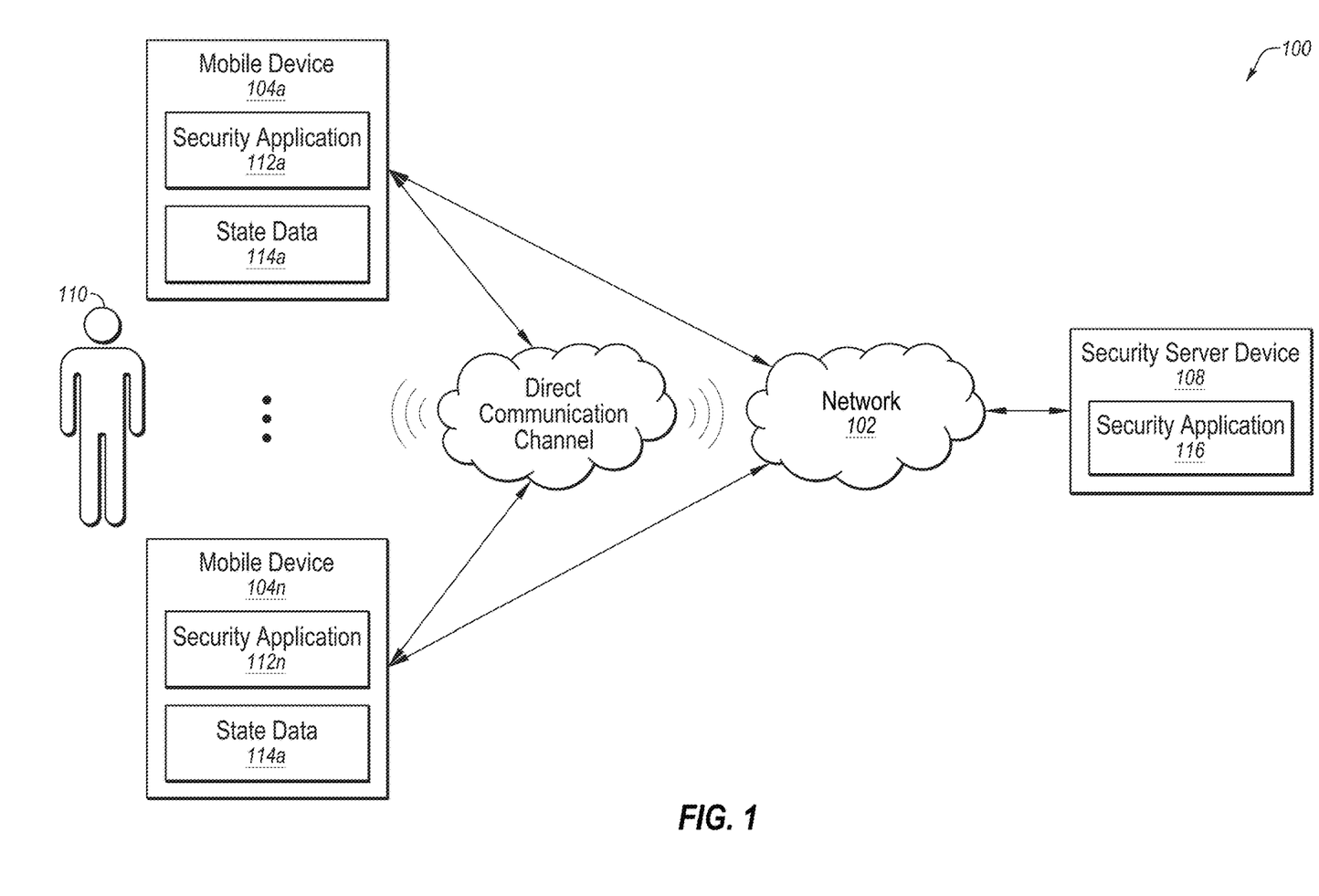
FIG. 1 illustrates an example system for routing server communications through a nearby mobile device.

Turning to the figures, FIG. 1 illustrates an example system 100 for routing server communications through a nearby mobile device. The system 100 may include a network 102, mobile devices 104a-104n, a direct communication channel 101, and a security server device 108.

In some embodiments, the network 102 may be configured to communicatively couple the mobile devices 104a-104n and the security server device 108 to one another, and to other devices, using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), a telephone network, a cellular network, the Internet, or some combination thereof.

Figure 3:
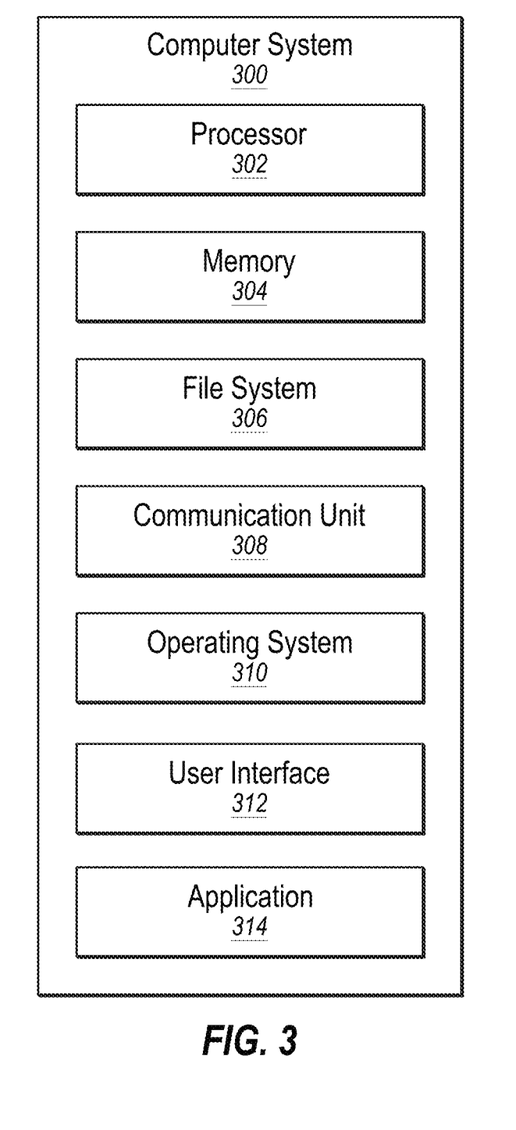
FIG. 3 illustrates an example computer system that may be employed for routing server communications through a nearby mobile device.

In some embodiments, the mobile devices 104a-104n may each be any computer system capable of communicating over the network 102 and the direct communication channel 101, examples of which are disclosed herein in connection with the computer system 300 of FIG. 3. The mobile devices 104a-104n may include security applications 112a-112n which may be employed by the user 110 (and/or by one or more other users) to monitor and/or secure the mobile devices 104a-104n (e.g., the mobile devices 104a-104n may all belong to the user 110, or may belong to multiple users). The security applications 112a-112n may be configured to function in connection with state data 114a-114n. The state data 114a-114n may indicate the current state of the mobile devices 104a-104n including, but not limited to, battery level, processor usage, memory usage, user interaction state, metered Internet connection state, and a running apps category state. The security applications 112a-112n may use the state data 114a-114n to determine which of the mobile devices 104a-104n is currently a more efficient mobile device that is able to communicate with the security server device 108 more efficiently.

The security applications 112a-112n may be configured to communicate over a direct communication channel 101. Unlike the network 102, which may enable communication over vast distances (e.g., over miles over the Internet), the direct communication channel 101 may be configured to enable communication between devices that are nearby (e.g., within ten meters of one another over Bluetooth). For example, the direct communication channel 101 may include a Bluetooth channel, such as a Bluetooth Low Energy (BLE) channel, or a Wi-Fi channel, or some other direct communication channel. In some embodiments, the direct communication channel 101 may be implemented using Google's nearby connection mechanism found at https://developers.google.com/nearby/.

In some embodiments, the security server device 108 may be any computer system capable of communicating over the network 102 and capable of hosting a security application 116, examples of which are disclosed herein in connection with the computer system 300 of FIG. 3. In some embodiments, the security application 116 may be configured to monitor and/or secure the mobile devices 104a-104n, such as in connection with the security applications 112a-112n.

In some embodiments, the security applications 112a-112n and the security application 116 may be, or may include the functionality of, Norton™ Mobile Security applications, made by NortonLifeLock, Inc.™

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
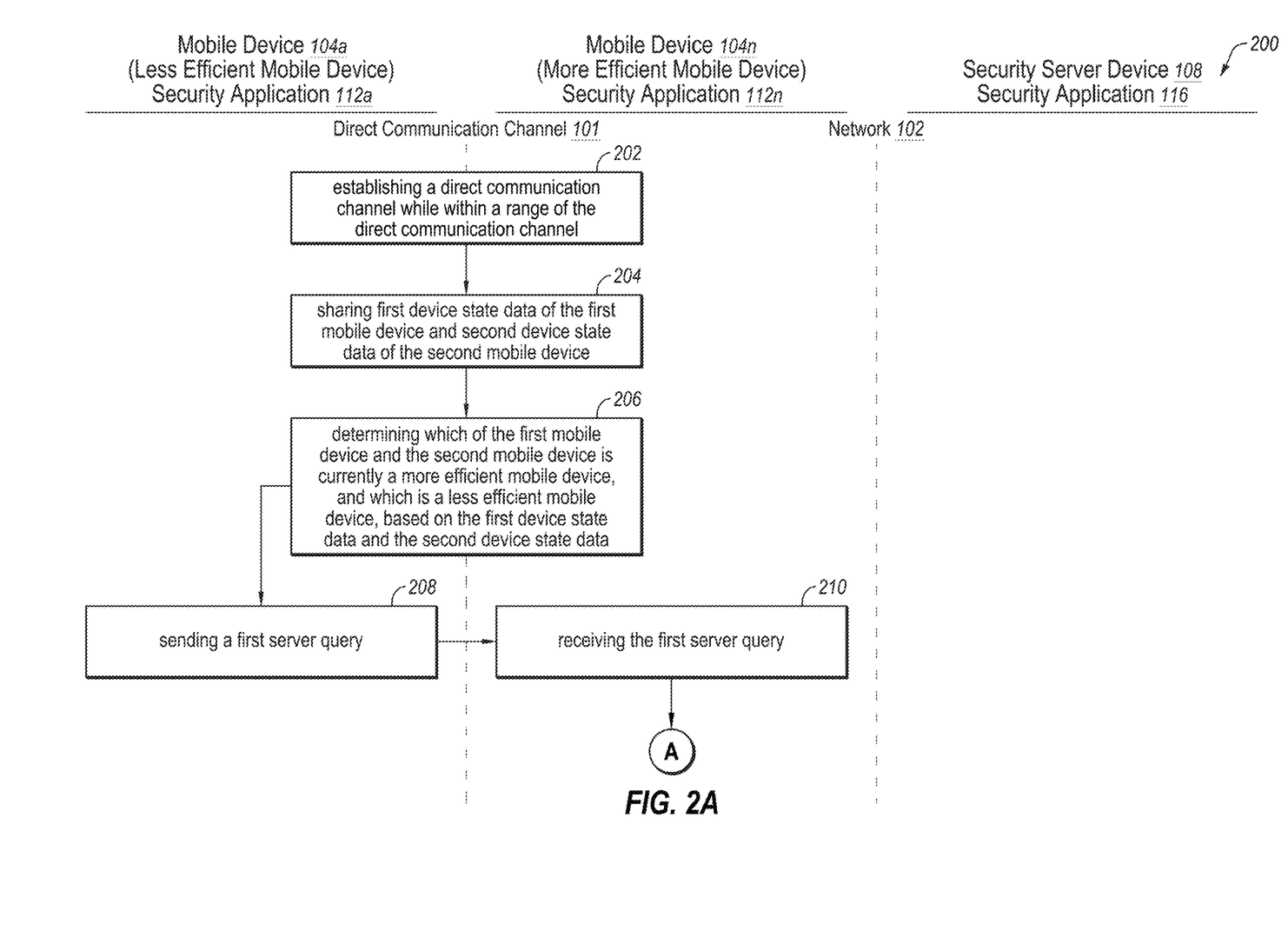
FIGS. 2A-2B are a flowchart of an example method for routing server communications through a nearby mobile device.
Figure 2B:
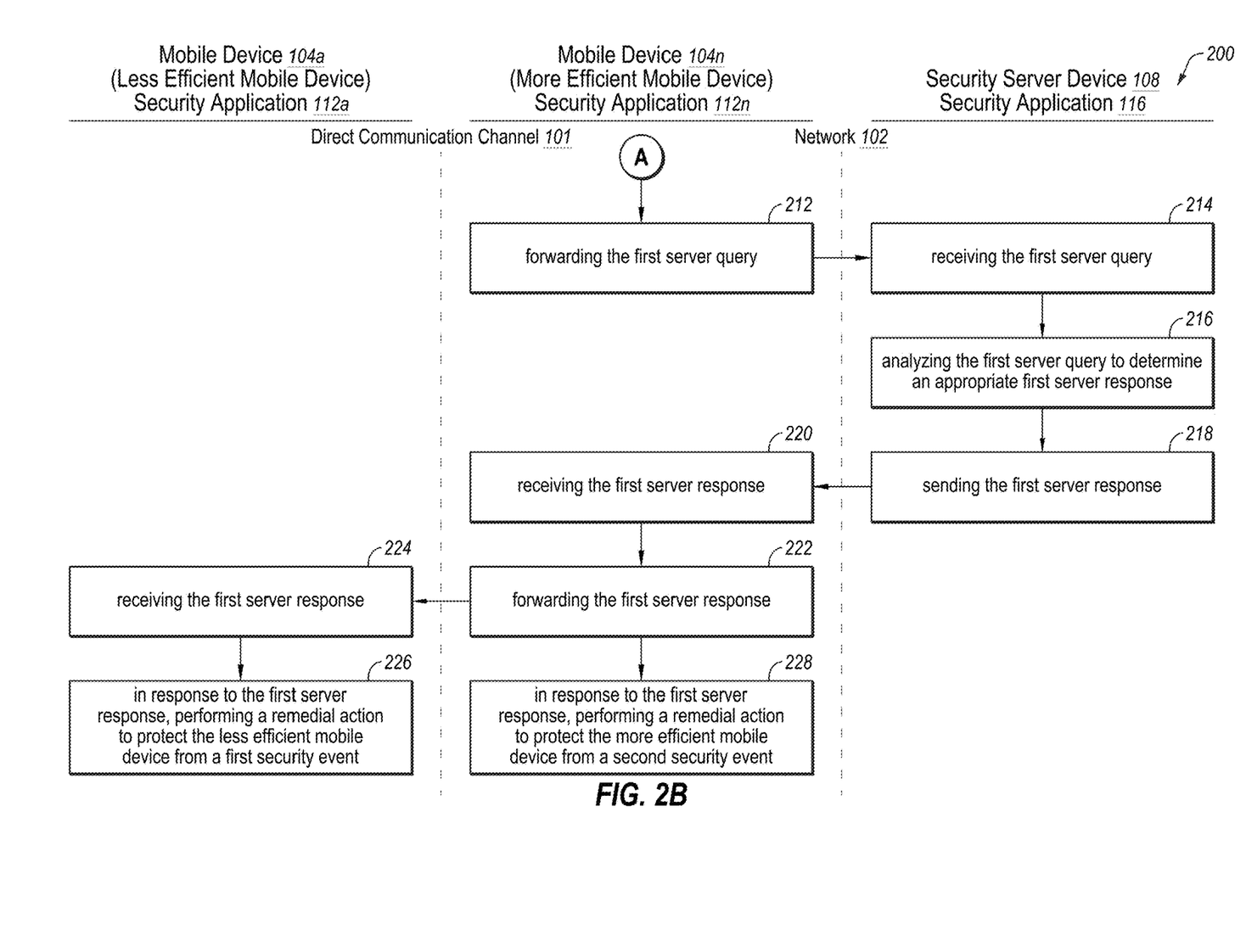

FIGS. 2A-2B are a flowchart of an example method 200 for routing server communications through a nearby mobile device. The method 200 may be performed, in some embodiments, by a device or system, such as by the security applications 112a-112n on the mobile device 104a-104n and/or the security application 116 on the security server device 108, or some other application or system, or some combination thereof. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at action 202, establishing a direct communication channel while within a range of the direct communication channel. In some embodiments, the direct communication channel may include a Bluetooth channel. In these embodiments, the Bluetooth channel may include a Bluetooth Low Energy (BLE) channel. In some embodiments, the direct communication channel may include a Wi-Fi channel. For example, the security applications 112a and 112n may establish, at action 202, a direction communication channel 101 while the mobile devices 104a and 104n are within range of the direction communication channel 101. For example, if the range of the direction communication channel 101 is ten meters (e.g., for a Class 2 Bluetooth transmitter transmitting at 2.5 mW), the security applications 112a and 112n may perform the action 202 while the mobile devices 104a and 104n are within ten meters of one another.

The method 200 may include, at action 204, sharing first device state data of the first mobile device and second device state data of the second mobile device. In some embodiments, the first device state data may include one or more of a first battery level state of the first mobile device, a first user interaction state of the first mobile device, a first metered Internet connection state or a first nonmetered Internet connection state of the first mobile device, a first processor usage state of the first mobile device, a first memory usage state of the first mobile device, and a first running apps category state of the first mobile device. In some embodiments, the second device state data may include one or more of a second battery level state of the second mobile device, a second user interaction state of the second mobile device, a second metered Internet connection state or a second nonmetered Internet connection state of the second mobile device, a second processor usage state of the second mobile device, a second memory usage state of the second mobile device, and a second running apps category state of the second mobile device. In some embodiments, the first device state data of the first mobile device and second device state data of the second mobile device may be shared between a first security application of the first mobile device and a second security application of the second mobile device. For example, the security applications 112a and 112n of the mobile devices 104a and 104n may share, at action 204, state data 114a and 114n with one another over the direction communication channel 101. This state data 114a and 114n may include some combination of a battery level state (e.g., that indicates a current battery charged percentage of the mobile device between 0% and 100%), a user interaction state (e.g., that indicates whether, or the extent to which, a user is currently interacting with the mobile device), a metered Internet connection state or a nonmetered Internet connection state (e.g., that indicates whether the mobile device is connected to the Internet over a nonmetered Wi-Fi connection or over a metered cellular connection), a processor usage state (e.g., that indicates a current processor usage percentage of the mobile device between 0% and 100%), a memory usage state (e.g., that indicates a current memory usage percentage of the mobile device between 0% and 100%), and a running apps category state (e.g., that indicates the category of currently running apps so that higher priority or more resource intensive apps, such as gaming apps, can be given priority to resources over lower priority or less resource intensive apps, such as calendar apps).

The method 200 may include, at action 206, determining which of the first mobile device and the second mobile device is currently a more efficient mobile device, and which is a less efficient mobile device, based on the first device state data and the second device state data. In some embodiments, the determining of which mobile device is currently a more efficient mobile device may include determining which mobile device is currently able to communicate with a server device more efficiently. In some embodiments, the determining of which mobile device is currently a more efficient mobile device may be determined by a first security application and/or by a second security application. For example, one or both of the security applications 112a and 112n may determine, at action 206, which of the mobile devices 104a and 104n is currently a more efficient mobile device (e.g., is currently able to communicate with the security server device 108 over the Internet more efficiently), and which is a less efficient mobile device, based on the state data 114a and 114n. In this example, the mobile device 104n may be determined to be the more efficient mobile device, and the mobile device 104a may be determined to be the less efficient mobile device, due to, for example, the mobile device 104n having one or more of a higher current battery charged percentage, less current user interaction, a nonmetered Wi-Fi connection, a lower current processor usage percentage, a lower current memory usage percentage, and lower priority or less resource intensive apps currently running.

The method 200 may include, at action 208, sending, and at action 210, receiving, a first server query over the direct communication channel. In some embodiments, the first server query may be related to a first security event of the less efficient mobile device. For example, the security application 112a (of the less efficient mobile device 104a) may send, at action 208, and the security application 112n (of the more efficient mobile device 104n) may receive, at action 210, a first server query over the direction communication channel 101. In this example, the first server query may be related to a first security event (e.g., a malware infection, a malware attack, etc.) of the less efficient mobile device 104a, such as a query for the security application 116 on the security server device 108 that is intended to elicit a response that included information to help the security application 112a protect the less efficient mobile device 104a from the first security event.

The method 200 may include, at action 212, forwarding, and at action 214, receiving the first server query over the Internet. For example, the security application 112n (of the more efficient mobile device 104n) may send, at action 212, and the security application 116 (of the security server device 108) may receive, at action 214, the first server query over the network 102 (e.g., the Internet).

The method 200 may include, at action 216, analyzing the first server query to determine an appropriate first server response. For example, the security application 116 (of the security server device 108) may analyze, at action 216, the first server query to determine an appropriate first server response. For example, if the first server query relates to a particular malware infection, an appropriate first server response may include information useful to protect a mobile device from the particular malware infection.

The method 200 may include, at action 218, sending, and at action 220, receiving, the first server response over the Internet. For example, the security application 116 (of the security server device 108) may send, at action 218, and the security application 112n (of the more efficient mobile device 104n) may receive, at action 220, the first server response over the network 102 (e.g., the Internet).

The method 200 may include, at action 222, forwarding, and at action 224, receiving the first server response over the direct communication channel. For example, the security application 112n (of the more efficient mobile device 104n) may send, at action 222, and the security application 112a (of the less efficient mobile device 104a) may receive, at action 224, the first server response over the direction communication channel 101.

The method 200 may include, at action 226, in response to the first server response, performing a remedial action to protect the less efficient mobile device from a first security event. In some embodiments, the performing of the remedial action may be performed by the first security application or by the second security application. In some embodiments, the performing of the remedial action at the less efficient mobile device may include one or more of blocking the less efficient mobile device from accessing the Internet, rolling back one or more changes at the less efficient mobile device that were made as a result of the first security event, disabling the less efficient mobile device, and powering off the less efficient mobile device. For example, the security application 112a (of the less efficient mobile device 104a) may perform, at action 226, a remedial action to protect the less efficient mobile device 104a from a first security event.

The method 200 may include, at action 228, in response to the first server response, performing a remedial action to protect the more efficient mobile device from a second security event. In some embodiments, the performing of the remedial action may be performed by the first security application or by the second security application. In some embodiments, the performing of the remedial action at the more efficient mobile device may include one or more of blocking the more efficient mobile device from accessing the Internet, rolling back one or more changes at the more efficient mobile device that were made as a result of the first security event, disabling the more efficient mobile device, and powering off the more efficient mobile device. In some embodiments, the first security event of the less efficient mobile device may match a second security event of the more efficient mobile device, and the method may further include, in response to the first server response, performing, by the first security application or by the second security application, a second remedial action at the more efficient mobile device to protect the more efficient mobile device from the second security event. For example, the security application 112n (of the more efficient mobile device 104n) may perform, at action 228, a remedial action to protect the more efficient mobile device 104n from a second security event. In this example, the more efficient mobile device 104n may have experienced a second security event that is similar or identical to the first security event suffered by the less efficient mobile device 104a. Therefore, the security application 112n may employ the same first sever response (which may include information to protect against the first security event) to protect the more efficient mobile device 104n from the matching second security event.

The method 200 may thus be employed to route server communications from the less efficient mobile device 104a through a nearby more efficient mobile device 104n in order to decrease the amount of resources consumed by the security application 112a by avoiding direct communication with the security server device 108 server over the Internet. The method 200 may be employed to cause the security application 112a of the less efficient mobile device 104a (e.g., that is less able to efficiently send query communication to the security server device 108 over the Internet without the least degradation to the performance of the mobile device) to avoid exacerbating the relatively high amount of resources already consumed due to the security application 112a running constantly by avoiding periodic communication (e.g., related to security events such as malware infections, malware attacks, etc.) with the security server device 108 over the Internet.

Although the actions of the method 200 are illustrated in FIGS. 2A-2B as discrete actions, various actions may be divided into additional actions, combined into fewer actions, reordered, expanded, or eliminated, depending on the desired implementation. For example, actions 202, 204, 206, 208, 212, 220, and 222 may be performed without performing the other actions of the method 200.

Further, it is understood that the method 200 may improve the functioning of a mobile device itself and may improve the technical field of minimizing resources consumed by mobile applications. For example, the functioning of the mobile device 104a of FIG. 1 may itself be improved by the method 200 by routing server communications from the less efficient mobile device 104a through a nearby more efficient mobile device 104n in order to decrease the amount of resources consumed by the security application 112a by avoiding direct communication with the security server device 108 server over the Internet.

FIG. 3 illustrates an example computer system 300 that may be employed for routing server communications through a nearby mobile device. In some embodiments, the computer system 300 may be part of any of the systems or devices described in this disclosure. For example, the computer system 300 may be part of any of the mobile devices 104a-104n and the security server device 108 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIGS. 2A-2B. These computer-executable instructions may be included, for example, in the operating system 310, in one or more applications, such as the security applications 112a-112n or the security application 116 of FIG. 1, or in some combination thereof.

The communication unit 308 may include any component, device, system, or combination thereof configured to transmit or receive information over a network, such as the direct communication channel 101 or the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a Wi-Max device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIGS. 2A-2B. In some embodiments, the application 314 (e.g., app) may be part of the operating system 310 or may be part of an application of the computer system 300, or may be some combination thereof. In some embodiments, the application 314 may function as any of the security applications 112a-112n or the security application 116 of FIG. 1, or in some combination thereof.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for routing server communications through a nearby mobile device, at least a portion of the method being performed by a first mobile device comprising one or more processors and a second mobile device comprising one or more processors, the method comprising:
    establishing a direct communication channel between the first mobile device and the second mobile device while within a range of the direct communication channel;
    sharing, between the first mobile device and the second mobile device, first device state data of the first mobile device and second device state data of the second mobile device;
    in preparation of both the first mobile device and the second mobile device communicating over the Internet, determining, by one or both of the first mobile device and the second mobile device, which of the first mobile device and the second mobile device is currently a more efficient mobile device for communicating with a server device more efficiently over the Internet, and which is a less efficient mobile device, based on the first device state data and the second device state data;
    sending, from the less efficient mobile device to the more efficient mobile device over the direct communication channel, a first server query;
    forwarding, from the more efficient mobile device to the server device over the Internet, the first server query;
    receiving, at the more efficient mobile device from the server device over the Internet, a first server response; and
    forwarding, from the more efficient mobile device to the less efficient mobile device over the direct communication channel, the first server response.

2. The method of claim 1, further comprising:
    in response to the first server response, performing a remedial action at the less efficient mobile device to protect the less efficient mobile device from a first security event.

3. The method of claim 2, wherein the performing of the remedial action at the less efficient mobile device comprises one or more of blocking the less efficient mobile device from accessing the Internet, rolling back one or more changes at the less efficient mobile device that were made as a result of the first security event, disabling the less efficient mobile device, and powering off the less efficient mobile device.

4. The method of claim 1, wherein the direct communication channel comprises a Bluetooth channel.

5. The method of claim 4, wherein the Bluetooth channel comprises a Bluetooth Low Energy (BLE) channel.

6. The method of claim 1, wherein the direct communication channel comprises a Wi-Fi channel.

7. The method of claim 1, wherein:
    the first device state data comprises a first battery level state of the first mobile device; and
    the second device state data comprises a second battery level state of the second mobile device.

8. The method of claim 1, wherein:
    the first device state data comprises a first user interaction state of the first mobile device; and
    the second device state data comprises a second user interaction state of the second mobile device.

9. The method of claim 1, wherein:
    the first device state data comprises a first metered Internet connection state or a first nonmetered Internet connection state of the first mobile device; and
    the second device state data comprises a second metered Internet connection state or a second nonmetered Internet connection state of the second mobile device.

10. The method of claim 1, wherein:
    the first device state data comprises a first processor usage state of the first mobile device; and
    the second device state data comprises a second processor usage state of the second mobile device.

11. The method of claim 1, wherein:
    the first device state data comprises a first memory usage state of the first mobile device; and
    the second device state data comprises a second memory usage state of the second mobile device.

12. The method of claim 1, wherein:
    the first device state data comprises a first running apps category state of the first mobile device; and
    the second device state data comprises a second running apps category state of the second mobile device.

13. A computer-implemented method for routing server communications through a nearby mobile device, at least a portion of the method being performed by a first mobile device comprising one or more processors and a second mobile device comprising one or more processors, the method comprising:
    establishing a direct communication channel between the first mobile device and the second mobile device while within a range of the direct communication channel;
    sharing, between a first security application of the first mobile device and a second security application of the second mobile device, first device state data of the first mobile device and second device state data of the second mobile device;
    in preparation of both the first mobile device and the second mobile device communicating over the Internet, determining, by one or both of the first security application and the second security application, which of the first mobile device and the second mobile device is currently a more efficient mobile device for communicating with a server device more efficiently over the Internet, and which is a less efficient mobile device, based on the first device state data and the second device state data;
    sending, from the less efficient mobile device to the more efficient mobile device over the direct communication channel, a first server query related to a first security event of the less efficient mobile device;

forwarding, from the more efficient mobile device to the server device over the Internet, the first server query;

receiving, at the more efficient mobile device from the server device over the Internet, a first server response; and forwarding, from the more efficient mobile device to the less efficient mobile device over the direct communication channel, the first server response.

14. The method of claim 13, further comprising:

in response to the first server response, performing, by the first security application or by the second security application, a first remedial action at the less efficient mobile device to protect the less efficient mobile device from the first security event.

15. The method of claim 14, wherein the performing of the remedial action at the less efficient mobile device comprises one or more of blocking the less efficient mobile device from accessing the Internet, rolling back one or more changes at the less efficient mobile device that were made as a result of the first security event, disabling the less efficient mobile device, and powering off the less efficient mobile device.

16. The method of claim 14, wherein:

the first security event of the less efficient mobile device matches a second security event of the more efficient mobile device; and the method further comprises, in response to the first server response, performing, by the first security application or by the second security application, a second remedial action at the more efficient mobile device to protect the more efficient mobile device from the second security event.

17. The method of claim 13, wherein the direct communication channel comprises a Bluetooth channel or a Bluetooth Low Energy (BLE) channel.

18. The method of claim 13, wherein the direct communication channel comprises a Wi-Fi channel.

19. The method of claim 13, wherein:

the first device state data comprises one or more of a first battery level of the first mobile device, a first processor usage state of the first mobile device, and a first memory usage state of the first mobile device; and the second device state data comprises one or more of a second battery level of the second mobile device, a second processor usage state of the second mobile device, and a second memory usage state of the second mobile device.

20. The method of claim 13, wherein:

the first device state data comprises one or more of a first user interaction state of the first mobile device, a first metered Internet connection state or a first nonmetered Internet connection state of the first mobile device, and a first running apps category state of the first mobile device; and the second device state data comprises one or more of a second user interaction state of the second mobile device, a second metered Internet connection state or a second nonmetered Internet connection state of the second mobile device, and a second running apps category state of the second mobile device.

\* \* \* \* \*